Oct. 12, 1971     L. BALDAUF ETAL     3,611,668

PROCESS FOR THE PRODUCTION OF CARBON DIOXIDE CARTRIDGES

Original Filed April 1, 1968

United States Patent Office 3,611,668
Patented Oct. 12, 1971

3,611,668
PROCESS FOR THE PRODUCTION OF CARBON DIOXIDE CARTRIDGES
Lajos Baldauf, Bazakerettye, Imre Radnai, Repcelak, János Vasvári, Budapest, and József Wolf, Repcelak, Hungary, assignors to Orszagos Koolaj Es Gazipari Troszt, Budapest, Hungary
Original application Apr. 1, 1968, Ser. No. 717,591. Divided and this application Apr. 29, 1970, Ser. No. 32,961
Int. Cl. B65b 31/00, 43/00
U.S. Cl. 53—29   3 Claims

ABSTRACT OF THE DISCLOSURE

A process for the production of a carbon dioxide cartridge for household purposes. A cylindrical body with a neck part and a diaphragm cross wall therein is produced by cold extrusion. Into the lower end of this cylindrical body, a sealing bottom with an upper ribbed part and a lower unribbed part is inserted. The lower open end of said cylindrical body is bent inwardly, while carbon dioxide under pressure is introduced through the open end of the cylindrical body and between the ribs of the sealing bottom. Then the bending operation is finished and, if using the pressure of carbon dioxide inside the cylindrical body, the unribbed lower part of the sealing bottom is pressed onto the inner wall of the inwardly bent lower end portion of the cylindrical body so as to close it by this sealing bottom.

---

Figure 1:
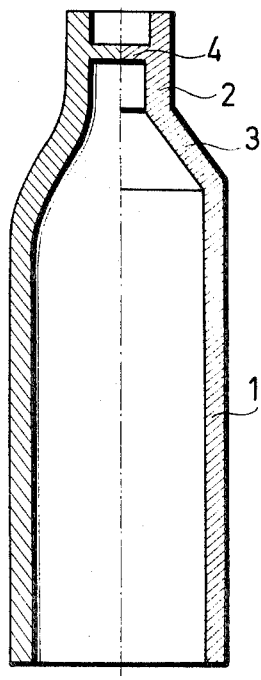

This application is a division of copending application Ser. No. 717,591, filed Apr. 1, 1968.

The cartridges containing high-pressure carbon dioxide and serving for household purposes are used in large quantities since they serve for preparing soda water at home in so-called siphon bottles. The cartridges used at present are made of steel, their production is relatively expensive since for their manufacture costly material, for instance fine steel is needed and the production itself requires more than 30 intricate operations.

A further disadvantage of the present cartridges consists in that their filling and sealing are carried out at the front, that is at the neck part so that a separate sealing plug must be inserted into the neck part of the cartridge and this plug is made of a different material than the cartridge itself, since it must be soft and suitable for being pierced by the needle of the siphon bottle. This sealing is not always perfect, therefore the cartridges, when ready, must be stored for some weeks and then weighed. Experience shows that the quantity of the underweighing cartridges—which are leaking—amounts to about 20 percent or even more.

The known expensive steel cartridges are not discarded after a single use but they are repeatedly refilled. This, however, requires the collecting and transport to the workshop of the used cartridges incurring thus considerable transport charges.

A further disadvantage of the repeated use consists in that the replacement of the sealing piece is difficult and, in addition, the inside of the cartridges becomes gradually rusty and dirty.

The invention is based in the first place on the perception that a cartridge made by means of cold extrusion will be strong enough that when made of relatively soft material, for instance of aluminum, it will resist safely the necessary internal pressure (approx. 70 to 75 atm.) and the aluminum makes possible a highly economical production of cartridges by means of cold extrusion.

A further advantage to be achieved by the invention is that cold extrusion makes it possible to make instead of a separate plug a pierceable diaphragm integral with the cartridge in the neck part which—especially when made of aluminum—is easy to be pierced and at the same time its sealing effect is perfect so that it surely retains the carbon dioxide and its production does not require any special operation since during the cold extrusion of the cartridge the sealing piece can be made in one operation in an extrely short time, for instance within 0.5 sec. During that time the complete cold extrusion can be carried out. When using the sealing diaphragm in the neck part, care must be taken of that the filling be carried out at the bottom part of the cartridge—which will be called the lower part. For this purpose the invention provides in the neck part of the cartridge a pierceable, completely gas-tight diaphragm integral with the other parts of the cartridge and, in the lower part a sealing bottom made of elastic material, preferably of plastic material is arranged which under the effect of the internal pressure engages the wall of the cartridge bottom whereby an excellent seal is ensured.

The invention eliminates the above mentioned drawbacks since the production costs of the cartridge are reduced to a fraction of those incurred hitherto, making thus possible for the user to throw away the cartridge after a single use. Thus, the making of soda water in the household becomes extremely economical, the administrative work and considerable expenses of the return transport are eliminated, the cartridges are always clean and hygienic and in addition, they weigh less than the conventional ones. The said diaphragm ensures a perfect seal, so that storing is eliminated and no refuse occurs; the sealing is safe even under tropical conditions, say up to approx. 50 to 55° C. Therefore, there is no need for the specification of a guaranteed expiration time, as the cartridge is gas-tight practically for an unlimited period.

It should be noted that the needle of the siphon bottle can more easily pierce the diaphragm of the cartridge made of aluminum, than the plug used until now.

The present invention comprises the discovery of a process for the production of a carbon dioxide cartridge for household purposes, in which a cylindrical body with a neck part and a diaphragm cross wall therein is produced by cold extrusion. Into the lower end of this cylindrical body, a sealing bottom with an upper ribbed part and a lower unribbed part is inserted. The lower open end of said cylindrical body is bent inwardly, while carbon dioxide under pressure is introduced through the open end of the cylindrical body and between the ribs of the sealing bottom. Then the bending operation is finished and, if using the pressure of carbon dioxide inside the cylindrical body, the unribbed lower part of the sealing bottom is pressed onto the inner wall of the inwardly bent lower end portion of the cylindrical body so as to close it by this sealing bottom.

Figure 2:
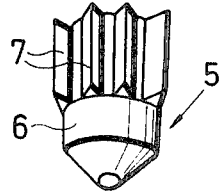
Figure 3:
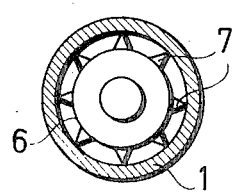

The invention is explained in detail in connection with the enclosed drawings. FIG. 1 is a section of the cylindrical body made by cold extrusion; on the right side of FIG. 1 an embodiment with a square transition of the constricted neck part is shown, whereas on the left side an embodiment with a rounded transition is to be seen. FIG. 2 is a side view of the elastic bottom to be inserted, provided with ribs and shown in perspective; FIG. 3 is the pertaining view from below; this figure shows at the same time in cross-section, too, the cylindrical body made by cold extrusion.

Figure 4:
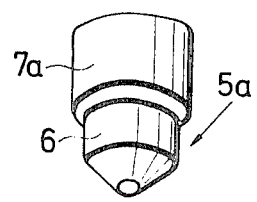
Figure 5:
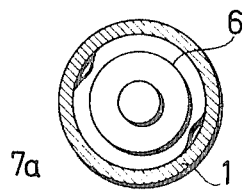

FIGS. 4 and 5 show two similar views of another—unribbed—embodiment of the elastic bottom.

Figure 6:
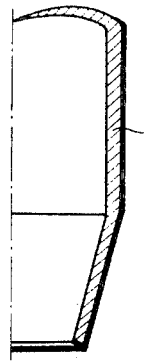
Figure 7:
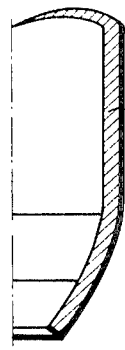
Figure 8:
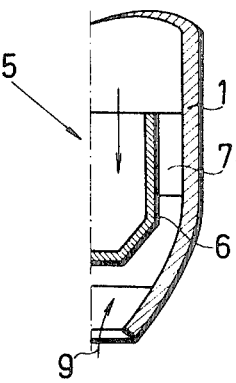
Figure 9:
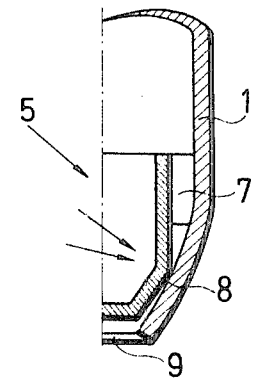

FIGS. 6 to 9 indicate the above mentioned various operations of the constriction and filling with carbon dioxide of the part made by cold extrusion, the elastic bottom being omitted in FIGS. 6 and 7, and with this bottom in FIGS. 8 and 9.

The cylindrical body 1 according to FIG. 1, provided with a constricted neck part is produced by a process and equipment known by themselves, by cold extrusion, using a cylindrical workpiece. Between the constricted neck part 2 and the cylindrical body 1 there is a conical transition part 3 which may be connected to the other parts either by a rounded-off passage or by a square one. The diaphragm cross-wall 4 arranged in the neck part is similarly made by cold extrusion, its production therefore does not require a separate operation, the cross-wall being integral with the neck part. Since this cross-wall is thin, that is diaphragm-like, the needle of the siphon bottle can easily pierce it and since its diameter is small, it can safely resist the internal overpressure and ensures, of course, a perfect seal, since it is integral with the other wall parts.

In order to fill the cartridge, in the lower end of the cylindrical body 1 there is arranged the elastic bottom or plug 5 according to FIGS. 2 and 3, which is made preferably of plastic material, is hollow and bullet-shaped and has a smooth cylindrical part 6 at the lower side and ribs 7 on the upper cylindrical part. This bottom being inserted, the ribs 7 adhere to the aluminum wall maintaining thus the bottom in its place. The carbon dioxide, however, can freely stream in between the ribs.

The same aim is achieved, although not as completely, by means of the cylindrical part 7a without ribs if the diameter of this cylindrical part is somewhat larger than the inner diameter of the cylindrical body 1. Thus if this elastic bottom 5a is pressed into the lower end of the cylindrical body 1, the part 7a—due to its larger diameter—will be wrinkled or will deflect at least at one point but possibly in several points as shown in FIG. 5 and thus the path of the carbon dioxide becomes free.

The elastic bottom being inserted, the lower end of the cylindrical body 1 is constricted that is bent or flanged as shown in FIG. 6, which is then followed by a further flanging as indicated in FIG. 7 (in both figures the elastic bottom is omitted for the sake of simplicity); now, a further and final flanging is carried out during which the carbon dioxide is led in which flows through the opening 9 at the bottom and between the ribs into the inside of the cartridge. The flow-in of carbon dioxide being now stopped and the pressure being reduced, the internal overpressure in the cartridge pushes the elastic bottom 5 above the opening 9, consequently the flange 8 of this bottom (FIG. 9) is forced against the inside wall of the cylindrical body 1 and ensures a perfect sealing. The displacement of the elastic bottom is indicated by an arrow in FIG. 8, whereas in FIG. 9 two arrows show the internal overpressure thrusting the elastic bottom against the flanged part of the cylindrical body, that is to say against that part which is not excessively distorted so that its inner surface is smooth enough for ensuring a perfect sealing. If, however, the elastic bottom were pressed into the opening 9 left free at the lower side, where the deformation would be considerable, it would be forced against the somewhat wrinkled inner surface of the bottom, failing thus to ensure a perfect gas-tightness.

If necessary, either for improving the seal or for esthetic reasons, a small perhaps colored extension may be provided in the middle of the elastic bottom which may be made either of the material of the bottom or may consist of a separately inserted piece which penetrates the opening 9 or possibly extends therefrom to a small extent.

What we claim is:

1. Process for the production of a carbon dioxide cartridge for household purposes, comprising cold extruding a cylindrical body with a constricted upper neck part, a lower open end, and a thin diaphragm cross wall in said neck part, inserting into the lower end of said cylindrical body a sealing bottom having an upper ribbed part and a lower unribbed part, narrowing said lower open end of said cylindrical body by bending it inwardly while introducing carbon dioxide under pressure through the open end of the cylindrical body and between the ribs of said sealing bottom, and finishing the bending operation by using the pressure of carbon dioxide inside the said cylindrical body to press the unribbed lower part of said sealing bottom onto the inner wall of said bent lower end portion of the cylindrical body so as to close the cylindrical body by said sealing bottom.

2. Process according to claim 1, comprising cold extruding said body from aluminum.

3. Process according to claim 1, comprising bending the lower end of the cylindrical body in several steps.

References Cited

UNITED STATES PATENTS

| 2,755,816 | 7/1956 | Collins | 137—533.17 X |
| 3,124,917 | 3/1964 | Dobbins | 53—88 |
| 3,179,309 | 4/1965 | Cope | 222—389 |

FOREIGN PATENTS

| 480,984 | 3/1938 | Great Britain | 53—7 |

TRAVIS S. McGEHEE, Primary Examiner

U.S. Cl. X.R.

53—7, 37